Figure 1:
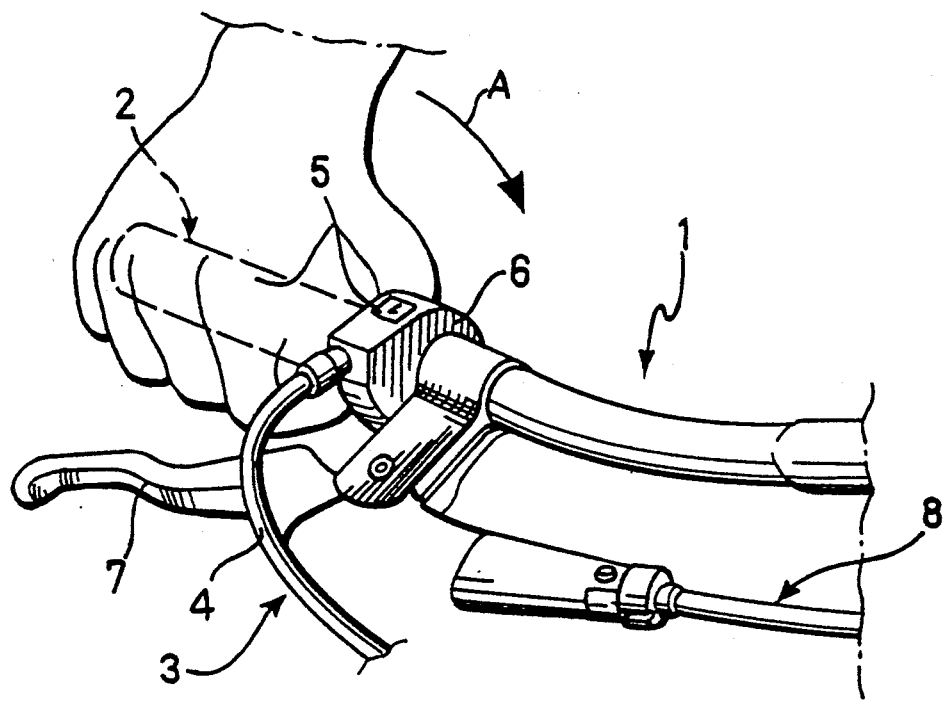

United States Patent

Romano

Patent Number: 5,134,897
Date of Patent: Aug. 4, 1992

[54] TWIST-GRIP DEVICE FOR OPERATING THE GEARS OF A BICYCLE

[75] Inventor: Antonio Romano, Padua, Italy

[73] Assignee: Campagnolo S.r.l., Vicenza, Italy

[21] Appl. No.: 600,375

[22] Filed: Oct. 18, 1990

[30] Foreign Application Priority Data

Oct. 20, 1989 [IT] Italy .............................. 67905 A/89
Jun. 4, 1990 [IT] Italy .............................. 67403 A/90

[51] Int. Cl.⁵ ..................... G05G 11/00; F16C 1/10
[52] U.S. Cl. ............................. 74/489; 74/502.2; 74/506; 74/475
[58] Field of Search .............. 74/475, 489, 502.2, 74/506

[56] References Cited

U.S. PATENT DOCUMENTS

| 4,241,617 | 12/1980 | Nagano et al. | 74/502.2 X |
| 4,352,303 | 10/1982 | Christner | 74/505 X |
| 4,876,913 | 10/1989 | Romano | 74/502.2 X |

FOREIGN PATENT DOCUMENTS

| 2510508 | 2/1983 | France | 74/506 |
| 531170 | 12/1957 | Italy | 74/502.2 |

Primary Examiner—Allan D. Herrmann
Assistant Examiner—David W. Laub
Attorney, Agent, or Firm—Armstrong, Nikaido, Marmelstein, Kubovcik & Murray

[57] ABSTRACT

A twist-grip device for operating the gears of a bicycle includes indexing associated with the hand-grip for snap-locating the hand-grip in the various positions corresponding to the engagement of the various gear ratios. The device includes a spring which biasses the hand-grip in the opposite sense from the sense of biassing of the spring of the derailleur which effects the engagement of the various gear ratios. The device also includes a screw for adjusting the average torque which needs to be applied to the hand-grip to snap-rotate the hand-grip between two successive positions. The rotation of the screw varies the preloading of a resilient expandable bush associated with the indexing pin springs.

11 Claims, 8 Drawing Sheets

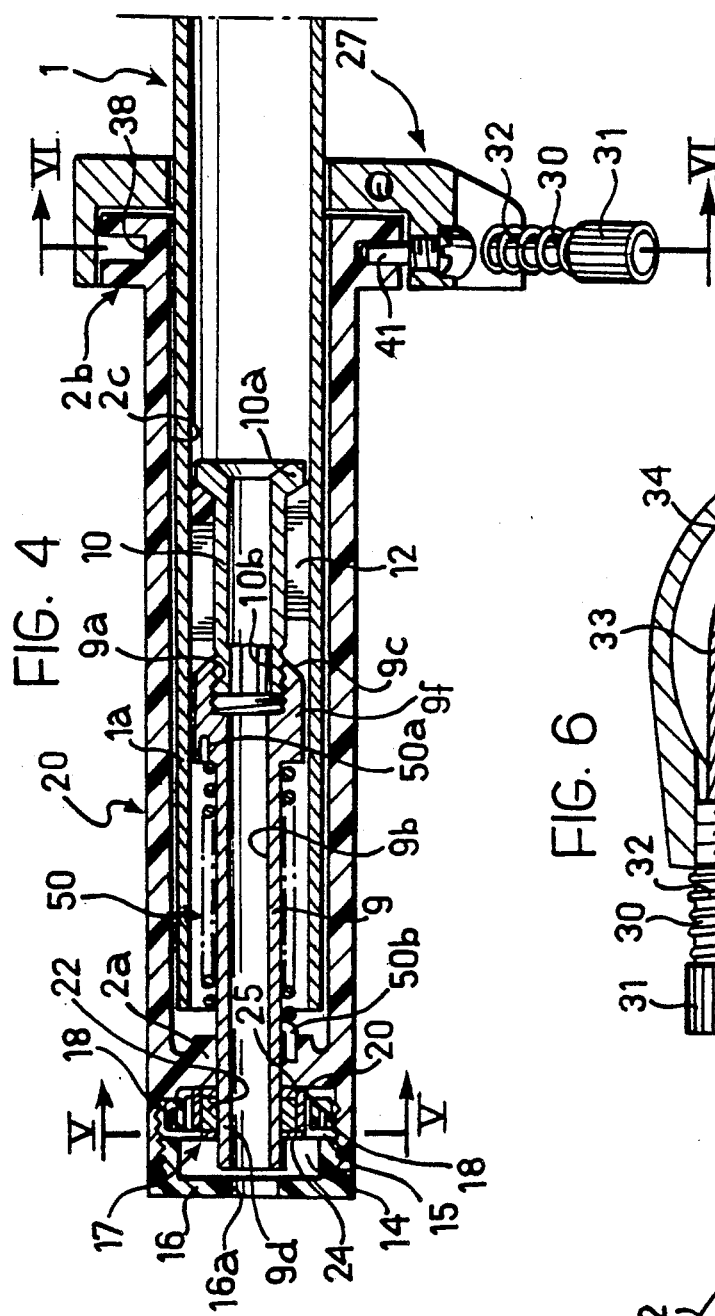
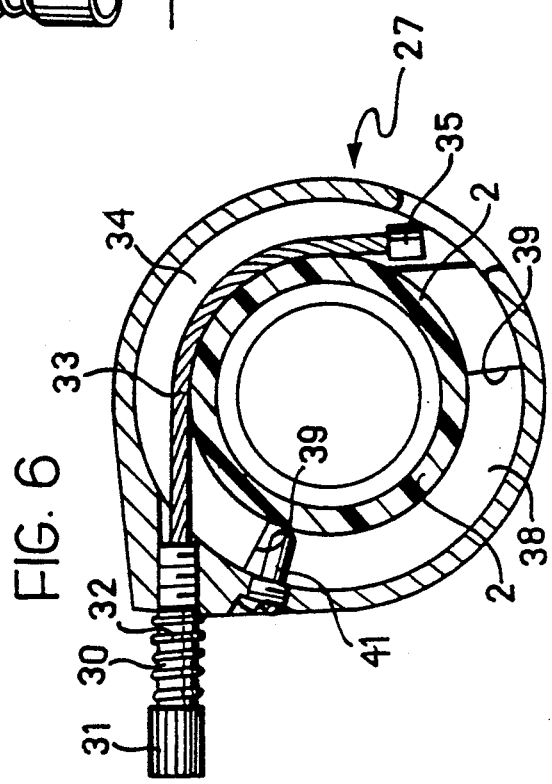
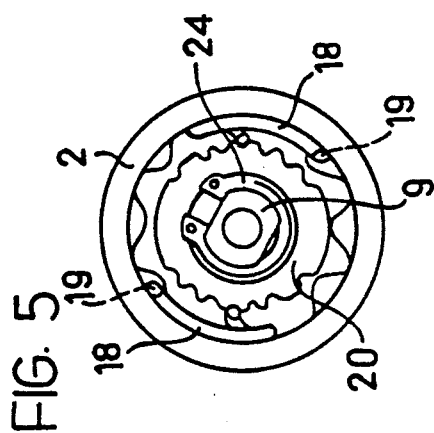

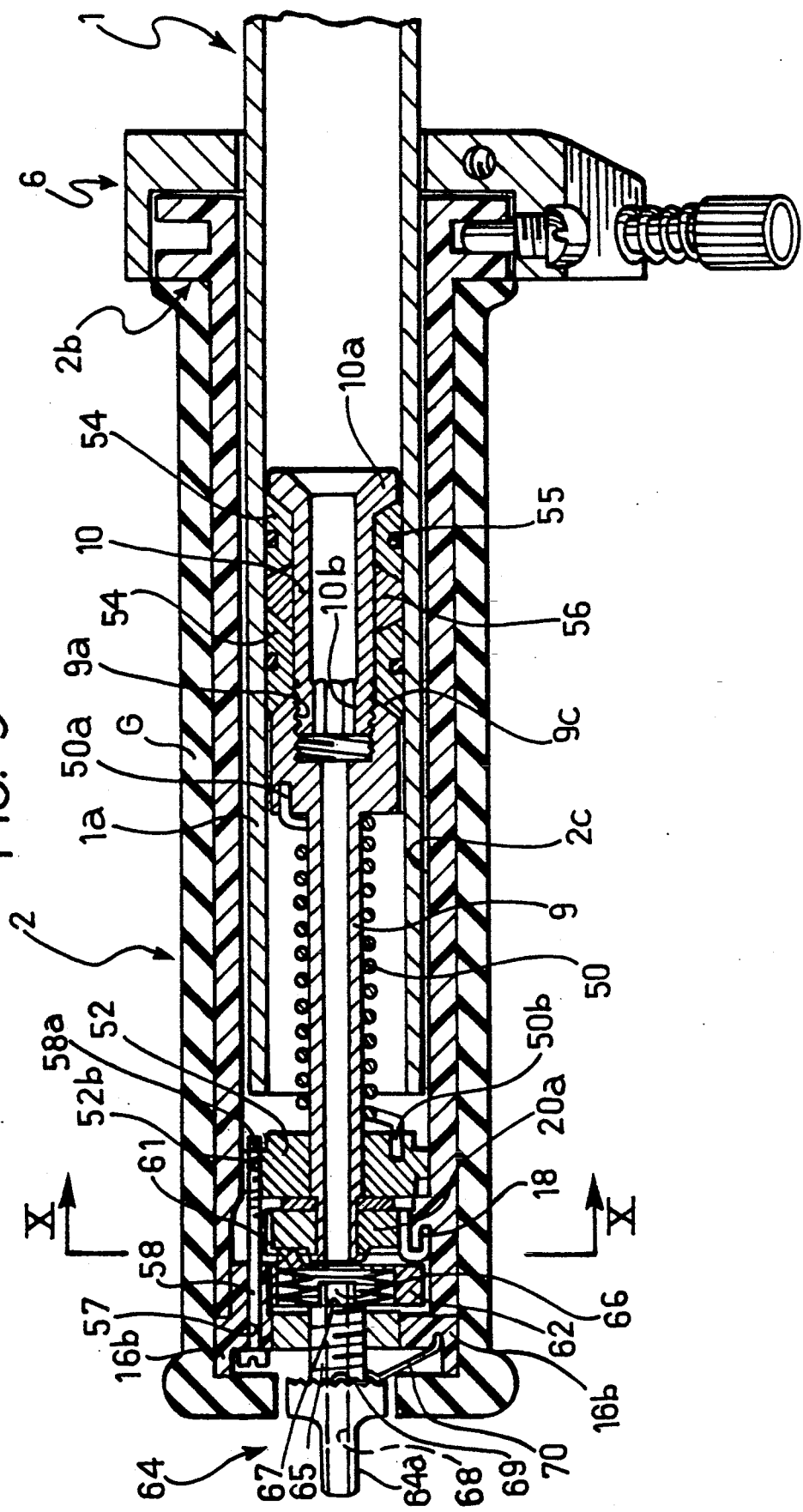

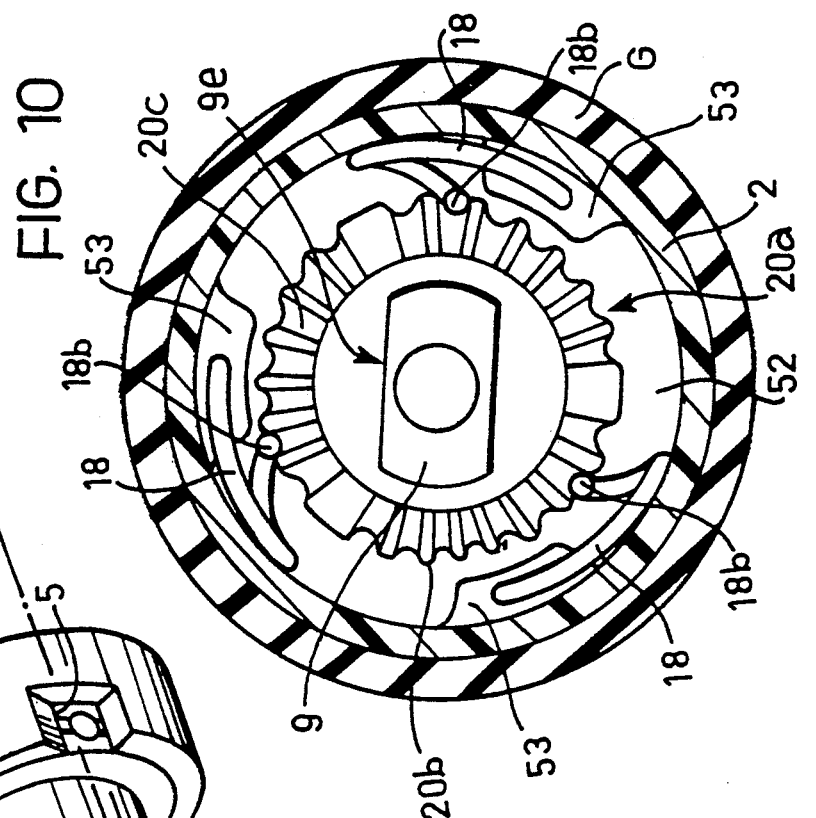
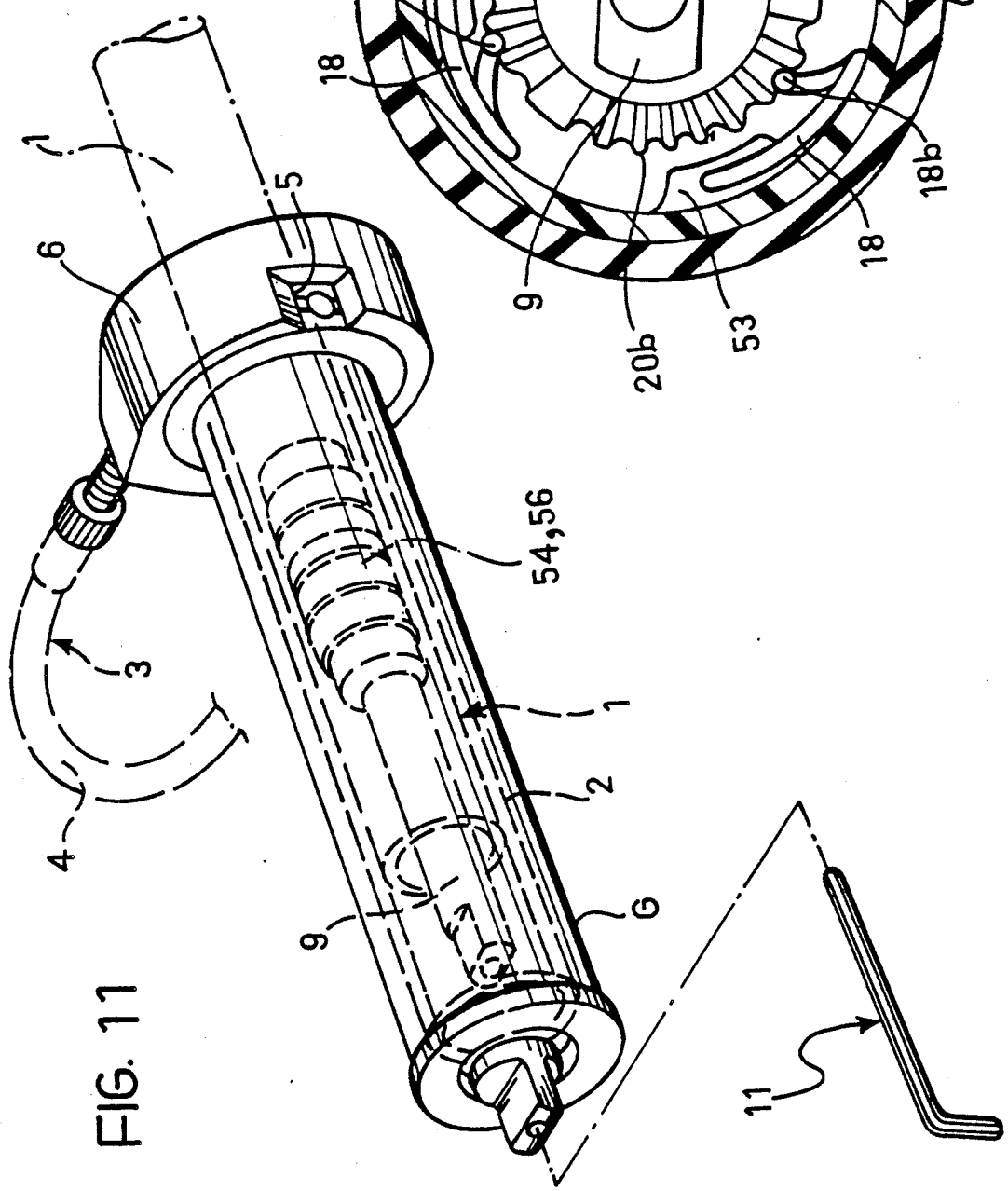

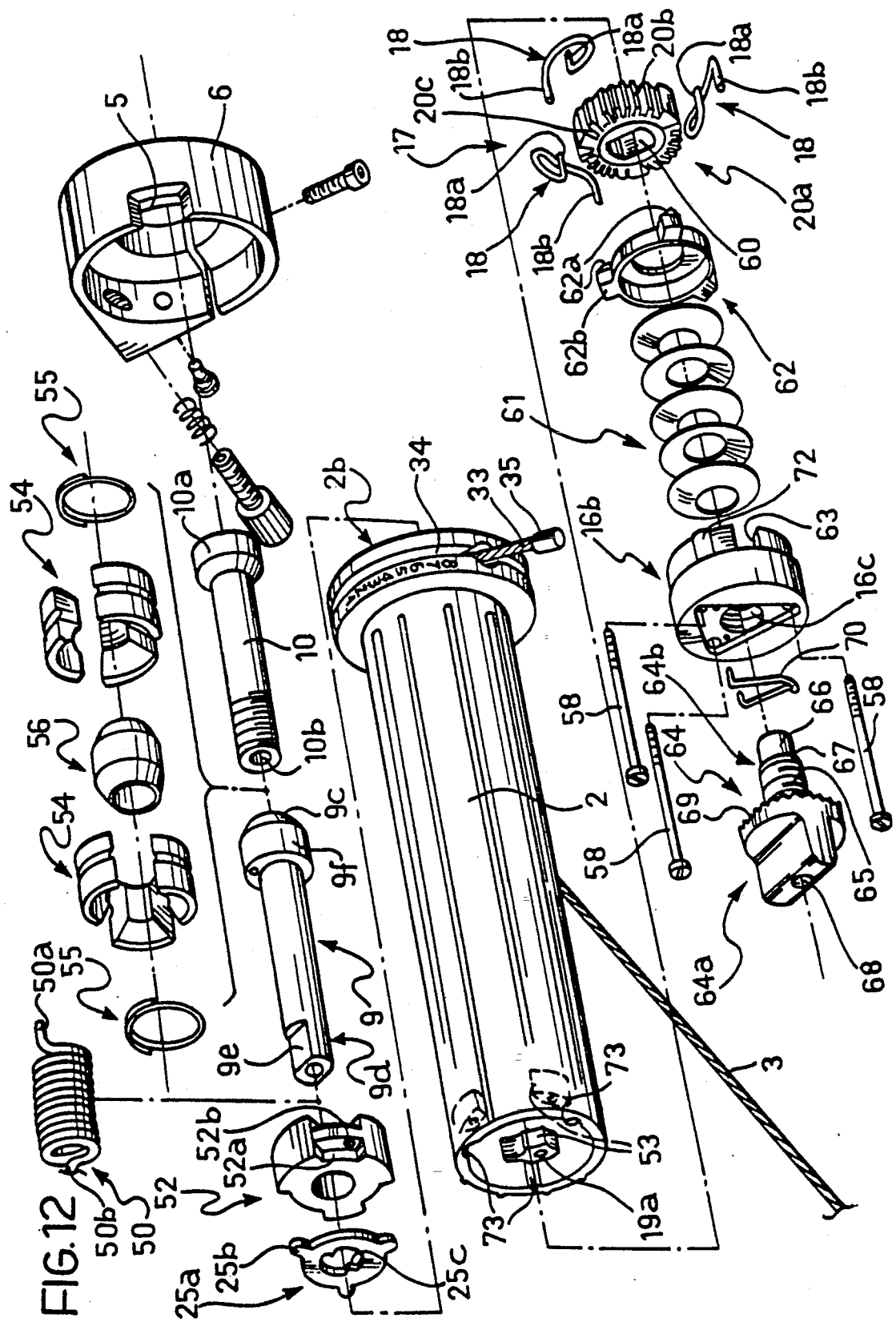

TWIST-GRIP DEVICE FOR OPERATING THE GEARS OF A BICYCLE

DESCRIPTION

The present invention relates to a twist-grip device for operating the gears of a bicycle, of the type including a hand-grip mounted rotatably on a bicycle handlebar and connected by a flexible cable transmission to a bicycle derailleur which controls the selective engagement of a bicycle chain with a set of different sprockets arranged side by side, the derailleur being provided with first resilient means which tend to bias the derailleur towards a position which corresponds to the engagement of the chain with a first end sprocket of the set of sprockets, the operating device also including indexing means associated with the operating hand-grip for snap-locating the hand-grip in the various positions corresponding to the engagement of the chain with the various sprockets.

In the present description, the term "derailleur" may refer equally well to the rear derailleur or to the front derailleur of the bicycle, the invention being applicable both to the control of the front derailleur and to the control of the rear derailleur. For the same reason, the term "sprocket" is used to indicate the usual sprockets mounted on the rear wheel hub of the bicycle (in the case of the rear derailleur) and the chain wheels mounted on the bottom bracket (in the case of the front derailleur).

A device of the type indicated above is described and illustrated in French patent No. 2,575,434. Control devices of this type lend themselves advantageously to use on mountain bikes (according to English terminology) or at any rate bicycles intended for rough ground. The control of the gears by the hand-grip in fact enables the cyclist always to keep both hands on the handlebars so as constantly to maintain optimum control of the bicycle. The solution proposed in the French patent cited above makes use of indexing means associated with the hand-grip to snap-locate the hand-grip in the various positions corresponding to the various gear ratios. The use of indexing means on the one hand facilitates the operation of the gears and on the other hand makes it necessary to apply a predetermined minimum force to the hand-grip in order to change the rear ratio. In spite of this, there is still a risk that the cyclist may operate the gears inadvertently, particularly when travelling over rough ground and exerting a certain force on the hand-grips of the handlebars in order to keep his balance. In order to resolve this problem, the device described in French patent No. 2,575,434 includes a device for locking the hand-grip in any desired position. This locking device obviously eliminates the risk of the undesired operation of the gears but, on the other hand, makes the operation of gears quite laborious since the cyclist must release the locking device and then reset it before and after the changing operation respectively.

The object of the present invention is to provide a twist-grip device for operating the gears of a bicycle which achieves a very good compromise between the need to reduce the risk of the undesired operation of the gears and the need to ensure the quick and easy operation of the gears by the cyclist.

According to the present invention, this object is achieved by a twist-grip operating device of the type indicated at the beginning of the present description, characterised in that second resilient means are associated with the hand-grip and bias the hand-grip in the opposite sense from the sense of biasing of the first resilient means of the derailleur of the bicycle so that the resultant effect of the first and second resilient means tends to bias the chain towards a position intermediate the two end sprockets of the set of sprockets.

According to conventional techniques, in the case of the rear derailleur, the first resilient means associated with the derailleur tend to bias the chain towards the smallest-diameter sprocket corresponding to the highest gear ratio. When the derailleur causes the chain to engage the largest-diameter sprocket, the resilient means of the derailleur reach their maximum loads. The risk of an undesired gear change would therefore be greatest in this condition. When the chain is on the smallest-diameter sprocket, however, the risk is least since the load on the resilient means associated with the derailleur is almost nil. In the device according to the invention, the resilient means provided in the hand-grip oppose the action of the resilient means associated with the derailleur so that the springs reach an equilibrium condition when the chain is on a sprocket intermediate the two end sprockets. When the chain is moved from this intermediate position towards either of the two end sprockets, the load acting on the hand-grip as a result of the effects of the first and second resilient means increases but does not reach the value it would reach in a conventional gear shift if the chain were on the largest-diameter sprocket. In other words, the use of resilient means associated with the twist-grip to oppose the effect of the resilient means of the derailleur causes the overall biassing effect exerted by the resilient means on the hand-grip in any condition to be considerably less than the biassing effect which occurs in conventional controls when the chain is on the largest-diameter sprocket. The risk of the accidental, undesired gear change is thus practically eliminated since, on the one hand, the force biassing the chain towards the intermediate equilibrium point of the resilient means is quite small and, on the other hand, the indexing means mean that the gears cannot be operated without the application of a force greater than a predetermined minimum value to the hand-grip.

According to another embodiment of the invention, the operating device also includes adjustment means associated with the indexing means for varying the torque needed to snap-rotate the hand-grip between two successive positions so that the force necessary to operate the hand-grip can be adjusted.

The user can thus vary, according to his preferences and to the kind of terrain (more or less rough), the average torque needed to operate the hand-grip and to overcome the resilient force of the indexing means which tend to keep the hand-grip in a predetermined position.

Preferably, the adjustment means comprise a screw-adjustment element housed in a corresponding threaded seat in the hand-grip for varying the resilient loading of a corresponding engagement element which is carried by the hand-grip and is adapted to snap-engage spaces between the teeth of a toothed ring fixed removably to the handlebar.

Naturally it is possible to use resilient engagement elements, for example, in the form of pin springs to ensure a minimum predetermined operating torque which is not adjustable, as well as auxiliary engagement elements acted on by resilient means whose preloading can be adjusted in order to provide for an operating torque greater than the minimum torque value.

Figure 2:
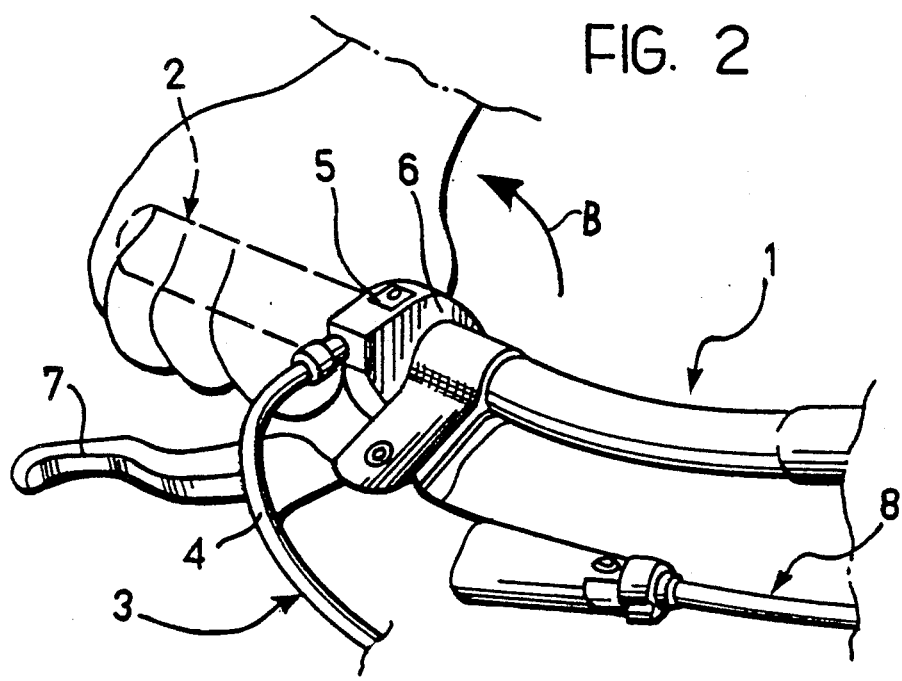
Figure 3:
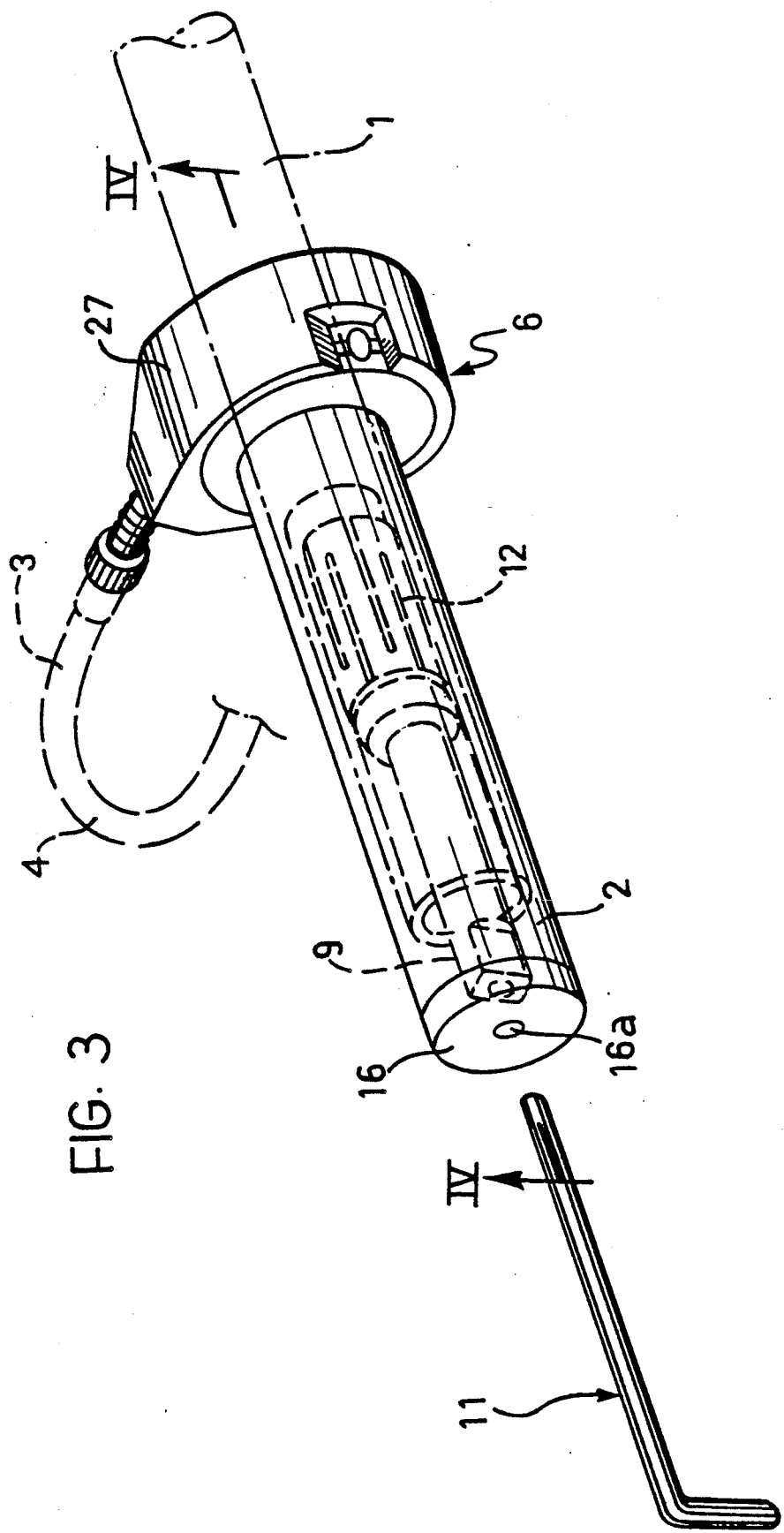
Figure 7:
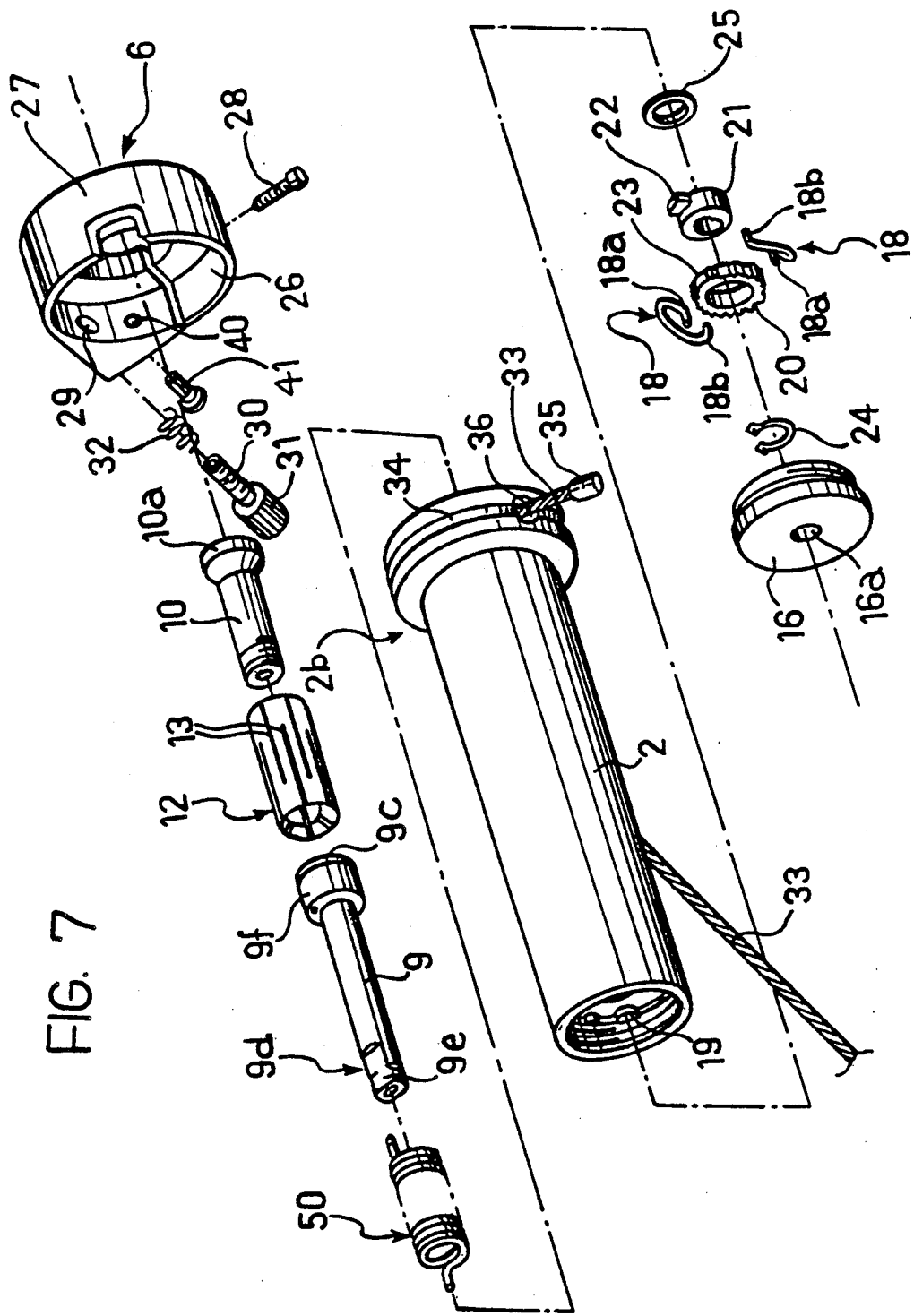
Figure 8:
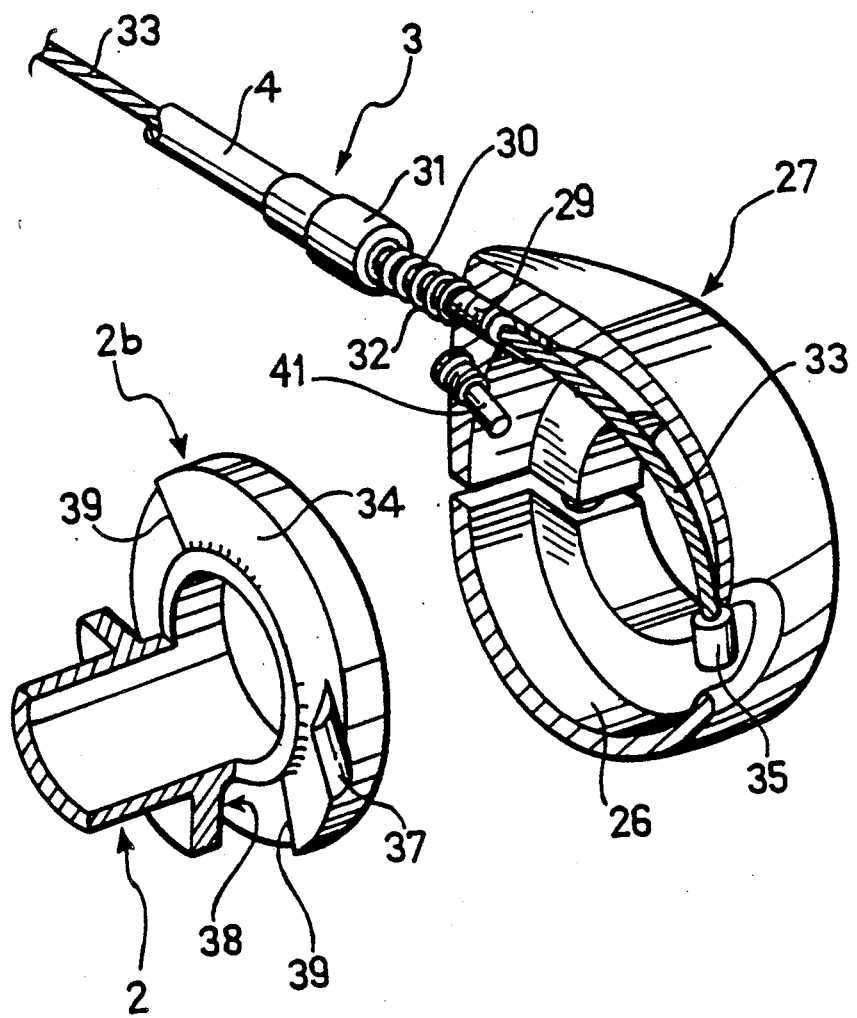

Further characteristics and advantages of the invention will become clear from the description which follows with reference to the appended drawings, provided by way of non-limiting example, in which:

FIGS. 1 and 2 are two perspective views which illustrate the operation of the device according to the invention, FIG. 3 is a further perspective view which shows the device according to the invention, FIG. 4 is a section taken on the line IV—IV of FIG. 3, FIG. 5 is a section taken on the line V—V of FIG. 4, FIG. 6 is a section taken on the line VI—VI of FIG. 4, FIG. 7 is an exploded perspective view of the device according to the invention, FIG. 8 is a partially-sectioned, exploded perspective view of a detail of the device according to the invention, FIG. 9 is a longitudinal section of a device according to another embodiment of the invention, FIG. 10 is a section taken on the line X—X of FIG. 9, FIG. 11 is a perspective view of the device of FIG. 9, and FIG. 12 is an exploded perspective view of the device of FIG. 9.

In FIGS. 1 and 2, a bicycle handlebar (of which only the right-hand end is visible) is indicated 1 and a rotatable hand-grip 2 is associated therewith for operating the gears of the bicycle. The rotatable hand-grip 2, which will be described in detail below, is connected by a flexible cable transmission 3 (only the sheath 4 of which is visible in FIGS. 1 and 2) to the rear derailleur of the bicycle, which may be of any known type. Naturally, the invention is also applicable to the operation of the front derailleur of the bicycle. A device according to the invention can thus be provided at each end of the handlebar so that two twist-grips are provided for operating the rear derailleur and the front derailleur respectively. The rear derailleur of the bicycle is not shown in the drawings since, as already stated, it may be produced according to any known technique and does not fall within the scope of the present invention. Still according to conventional techniques, the rear derailleur controls the selective engagement of the bicycle chain with a set of sprockets associated with the rear wheel hub of the bicycle. Still according to conventional techniques, a spring is associated with the derailleur and tends to bias the chain towards the position in which it is engaged with the smallest-diameter sprocket corresponding to the highest gear ratio. As will be shown in more detail below, the rotatable hand-grip 2 is formed and arranged in such a way that it pulls the cable of the transmission 3, causing the chain to be displaced towards the larger-diameter sprockets, when the hand-grip is rotated in the sense indicated by the arrow A in FIG. 1. The chain is displaced towards the smaller-diameter sprockets corresponding to the higher gear ratios, however, when the hand-grip is rotated in the sense indicated by the arrow B in FIG. 2. According to a further preferred characteristic, the device according to the invention provides for a window 5 formed in a sleeve 6 fixed rigidly to the handlebar in correspondence with the inner end of the hand-grip 2. The window 5 enables the display of a number which is indicative of the gear ratio engaged and is applied to one end of the hand-grip itself, as will be described in detail below. In the case of the embodiment illustrated in FIGS. 1 and 2, the numbers relate to the engagement of the first and sixth gear ratios respectively, as can be seen from the numbers displayed in the window 5. Naturally, the usual brake-operating lever 7 is mounted adjacent the hand-grip 2 and has a flexible cable transmission 8 for operating the brake. Moreover, in conventional manner, the body 2 may be covered by a sheath defining the grip (not shown).

With reference to FIGS. 4 and 7, the hand-grip 2 has a tubular plastics body with a hub 2a at one end and a collar 2b at the other end. The cylindrical cavity (indicated 2c) of the body of the hand-grip 2 houses the cylindrical end part 1a of the handlebar 1 with clearance. The body of the hand-grip 2 is mounted for rotation about its axis on the end 1a of the handlebar 1 by means of the hub 2a which slidingly engages a tubular metal rod 9 fixed inside the handlebar 1 and having an end part which projects from the end of the handlebar. The rod 9 is fixed in the handlebar 2 in the following manner. The end 9f of the rod inside the handlebar has a larger diameter than the rest of the rod 9 and has a threaded axial hole 9a into the end of which the cylindrical cavity 9b of the tubular rod 9 opens. A screw 10 with a conical head 10a and a hexagonal cavity 10b in its threaded end is screwed into the threaded hole 9a. The hexagonal cavity 10b enables the screw 10 to be operated by means of a key 11 of hexagonal cross-section (FIG. 3) which can be inserted through the cavity 9b in the rod 9.

An expansible bush 12, for example of plastics material, is interposed between the conical head 10a of the screw 10 and the end surface 9c of the larger end portion of the rod 9, which is also conical, and has conical end surfaces complementary to the surface of the head 10a and the surface 9c. When the screw 10 is tightened in the threaded hole 9a, the head 10a is brought towards the surface 9c and the bush 12 consequently expands in the cavity in the handlebar 1. The assembly constituted by the screw 10, the bush 12 and the rod 9 is thus firmly fixed to the handlebar 1. In the particular embodiment shown, the expansible bush 12 is made from a bush of plastics material by the formation of longitudinal cuts in the wall of the bush, extending from alternate ends of the bush for a distance less than the overall length of the bush. These cuts can be seen, indicated 13, in FIG. 7.

The free end 9d of the tubular rod 9 projects through the hub 2a into a chamber 14 which is defined by the hub 2a, by a tubular extension 15 of the hand-grip body 2 extending beyond the hub 2a, and by a plug 16 of plastics material screwed into the tubular appendage 15.

The indexing device for snap-locating the hand-grip in the various positions corresponding to the various gear ratios is mounted in the chamber 14. In the embodiment illustrated, this device, generally indicated 17, is substantially of the type illustrated in FIGS. 12 and 13 of the same Applicant's U.S. Pat. No. 4,876,913 (based on Italian Patent Application No 21647-A/86 relating) to lever-operated gears. This type of indexing device is fitted in the gear lever marketed by the Applicant under the trade mark "Syncro".

With reference to FIGS. 4, 5 and 7, the indexing device 17 includes two pin springs 18 each having an attachment end 18a fixed in a hole 19 (FIGS. 7 and 5) formed in the wall of the hand-grip 2 and an active end 18b which engages the toothed surface of a toothed ring 20 fixed to the rod 9. In the particular embodiment illustrated, the ring 20 is fitted over a bush 21 with two diametrally-opposed radial projections 22 which are housed in two seats 23 (one of which is partially visible in FIG. 7) in the ring 20. The ring 20 is thus connected for rotation with the bush 21. The latter is keyed in turn to the free end 9d (FIG. 7) of the rod 9, the free end having two diametrally-opposed flat faces 9e (one of which is visible in FIG. 7) which engage corresponding flat surfaces of the central hole in the bush 21. The bush 21 and consequently the ring 20 are thus prevented from rotating on the rod 9. Axial fixing is achieved by means of a resilient ring 24 (FIG. 4) which is fitted on the rod 9 and holds the bush 21 and the ring 20 against the wall of the hub 2a with the interposition of a washer 25.

By virtue of this arrangement, the toothed ring 20 is fixed rigidly to the rod 9 and hence to the handlebar 1, whilst the two pin springs 18 can move with the hand-grip 2. The active ends 18b of the pin springs 18 are urged by the resilient loading of the springs against the toothed surface of the ring 20 so that the active ends snap-engage in successive spaces between the teeth of the ring 20 when the hand-grip 2 is rotated.

The plug 16 has a central hole 16a which enables the key 11 to be inserted in order to lock the bush 12 in the handlebar 1 and release it therefrom, as described above.

The use of the indexing device described above provides, amongst other things, a characteristic advantage of the device which has already been described in the Applicant's previous Italian Patent Application No. 21647-A/86. In fact, if the cyclist changes the set of sprockets mounted on the rear wheel hub of the bicycle, the toothed ring 20 can simply be replaced by a ring with a configuration such as to ensure the correct location of the chain in the various positions of engagement on the sprockets of the new set.

The end collar 2b of the hand-grip 2 is housed in the skirt 26 of a clamp body 27 which is mounted around the handlebar 1 and is clamped thereto by the tightening of a tangential screw 28 which is used to close the clamp body (FIG. 7). The clamp body 27 has a threaded hole 29 into which is screwed the threaded shank 30 of a screw 31 to which the end part of the sheath 4 (FIGS. 3 and 8) of the flexible cable transmission 3 is fixed. According to a conventional technique, a helical spring 32 is interposed between the screw 31 and the clamp body 27.

The flexible metal cable, indicated 33, of the flexible cable transmission 3 passes through the sheath 4, the screw 31, the shank 30, and the hole 29 in the clamp body 27 and is housed in a circumferential groove 34 formed in the collar 2b. The end of the metal cable 33 is fixed to a bob 35 which is locked in a seat 36 defined by two recesses 37 formed in the facing radial walls of the collar 2b defining the groove 34. One of the recesses 37 is visible in FIG. 8. The collar 2b also has a circumferential track 38 whose angular extent corresponds to the maximum possible travel of the hand-grip and which is defined at its ends by two walls 39 located in planes containing the axis of the hand-grip 2. The clamp body 27 has a radial hole 40 (FIG. 7) into which is screwed a pin 41 which projects inwardly of the clamp body and engages the track 38. When the hand-grip is rotated, it operates the rear derailleur of the bicycle by means of the flexible cable 33. At the same time, the pin 41 slidably engages the track 38 and defines the travel-limit positions of the hand-grip by coming into contact with the two respective end walls 39 of the track 38.

As already indicated above, the collar 2b may have numbers on its peripheral surface indicative of the various gear ratios which can be engaged, whilst the skirt 26 of the clamp body 27 may have a window 5 (as in the embodiment shown in FIGS. 1 and 2) for displaying the gear ratio engaged.

When the cyclist acts on the hand-grip 2 and rotates it about its axis, the hand-grip operates the rear derailleur of the bicycle by means of the metal cable 33. The indexing device 17 enables the hand-grip to be snap-located in the various positions corresponding to the engagement of the various gear ratios. According to the conventional technique, the derailleur has a spring which tends to bias the derailleur (and hence the hand-grip 2 by means of the cable 33) towards the position corresponding to the engagement of the chain with the smallest-diameter sprocket (the highest gear ratio). This means that, when the chain is on the largest-diameter sprocket (the lowest gear ratio), the biassing force exerted by the derailleur spring is greatest. Thus, in this condition, there would be a risk that the cyclist could inadvertently change gear, particularly when he is travelling over rough ground and therefore needs to lean on the handlebar with a certain force.

In order to avoid this problem, the device according to the invention provides a helical spring 50 associated with the hand-grip 2. More precisely, the spring 50 is mounted coaxially around the tubular rod 9 and has respective tails 50a, 50b fixed to the larger end portion 9f of the rod 9 and to the hub 2a of the hand-grip 2. The tail 50a is thus fixed relative to the handlebar 1, whilst the tail 50b is movable with the hand-grip 2. The spring 50 is arranged so as to bias the hand-grip 2 in the opposite sense from the sense of biassing due to the derailleur spring. More precisely, the spring 50 tends to bias the hand-grip 2 in the sense indicated by the arrow A in FIG. 1, that is, in the sense corresponding to the engagement of the chain on larger-diameter sprockets. The derailleur spring, on the other hand, biasses the hand-grip 2 in the sense indicated by the arrow B in FIG. 2, which corresponds—as already stated—to the engagement of the chain on the smaller-diameter sprockets. The effects of the two springs reach an equilibrium condition when the chain is engaged on a sprocket intermediate the smallest-diameter sprocket and the largest-diameter sprocket. When the chain is in this position, no biassing force is exerted on the chain and there is thus a minimal risk of the gears being changed inadvertently since, to do so, it is necessary to overcome the entire force with which the spring 18 of the indexing device 17 opposes the rotation of the hand-grip 2. When the chain is on the largest-diameter sprocket, however, the chain is subject to a biassing force resulting from the opposing effects of the hand-grip spring 50 and the derailleur spring. In fact, the spring 50 is mounted in such a way that, even when the chain is on the largest-diameter sprocket, it exerts a biassing force on the derailleur which opposes that exerted by the derailleur spring. The biassing effect on the chain which results from the opposite effects of the two springs is less, in absolute terms, than that which occurs in conventional controls which are subject only to the biassing of the spring associated with the derailleur itself. The risk of the undesired operation of the gears is therefore greatly reduced.

Conversely, when the chain is on the smallest-diameter sprocket, it is subject to the biassing effect which results from the opposing effects of the derailleur spring and the hand-grip spring. In this case also, the resulting effect is insufficient, in practice, to give rise to the risk of an inadvertent gear change.

As already indicated, the conformation of the toothed surface of the ring 20 is selected in dependence on the sprockets which have to mesh with the chain. Moreover, the profiles of the teeth of the ring 20 can be selected—at the design stage—so as to achieve the desired amount of effort to be applied to the hand-grip in order to operate the gears. Moreover, the profile of each tooth of the ring 20 may be asymmetrical, that is, with one flank steeper than the other, in order to oppose the displacement of the chain under the biassing effects of the two springs of the derailleur and the hand-grip in a different manner according to whether the chain is on the large sprockets or on the small sprockets. This may be necessary if the resultant effect of the two springs has a different absolute value according to whether the chain is on the large sprockets or on the small sprockets.

According to another embodiment and with reference to FIGS. 9 to 12 (in which elements the same as or similar to those described above are indicated by the same reference numerals), the hand-grip 2 is covered by an outer rubber sheath G and has a tubular body of plastics material in one end of which a support bush 52 is inserted in abutment with internal radial appendages 53 in the cylindrical cavity 2c of the hand-grip 2. On each of its end faces, the bush 52 has three equiangularly-spaced notches 52a for keying the bush to the body of the hand-grip 2 in correspondence with the internal radial appendages 53 which are engaged in the notches.

The body of the hand-grip 2 is mounted for rotation about its axis on the end 1a of the handlebar 1 by means of the support bush 52 whose central hole is engaged rotatably by the tubular rod 9. In this embodiment, the rod 9 is fixed within the handlebar 1 by a pair of rings 54 divided each into three portions held together by spring clips 55 and separated by a central ring 56 with conical end surfaces complementary to the lateral surfaces of the rings 54, the rings being interposed between the conical head 10a of the screw 10 and the end surface 9c of the larger end portion 9f of the rod 9. The rings 54 also have conical end surfaces complementary to the surface of the head 10a of the locking screw 10 and the end surface 9c of the rod 9. The tightening of the screw 10 in the threaded hole 9a by the operation of the key 11 causes the head 10a to move towards the surface 9c, consequently enlarging the split rings 54 within the cavity in the handlebar 1. The assembly constituted by the screw 10, the split rings 54, the central ring 56 and the rod 9 is thus fixed firmly to the handlebar 1.

The free end of the tubular rod 9 projects from the support bush 52 into a chamber defined by the bush 52, the body of the hand-grip 2 and a plug 16b of plastics material having axial holes 57 for the passage of tie bolts 58 whose threaded ends 58a are adapted to cooperate with threaded holes 52b in the support bush 52. The tightening of the tie bolts 58 locks the plug 16b on the end of the body of the hand-grip 2 by virtue of the axial engagement between the support bush 52 and the internal radial appendages 53 of the body of the hand-grip 2.

On its lateral surface, the plug 16b also has three axial ribs 72 whose shapes correspond to those of three internal axial grooves 73 in the end of the tubular body of the hand-grip 2. The plug 16b is keyed to the hand-grip 2 by the engagement of the ribs 72 in the grooves 73.

The indexing device 17 is mounted in the chamber delimited by the bush 52 and, in this embodiment, includes three pin springs 18, the attachment end 18a of each of which is secured in a hole 19a in the corresponding projection 53 formed on the inner wall of the hand-grip 2, its active end engaging the lateral toothed surface 20b of a toothed ring 20a keyed by its internal hole 60 on the free end of the tubular rod 9, which has two diametrally-opposed flat faces 9e. When the device is in the assembled configuration, the toothed ring 20a thus faces the support bush 52 with the interposition of a shaped washer 25a which has outer radial tabs 25b and inner radial projections 25c whose functions will become clear from the following description.

The toothed ring 20a also has an end face 20c with axial teeth oriented radially and corresponding to the teeth of the lateral surface 20b. A locking ring 62 which has axial projections 62a oriented radially towards the surface 20c, as well as radial appendages 62b whose shapes correspond to those of guides 63 in the plug 16b, is urged axially against the end surface 20c of the toothed ring 20a in a resilient manner by Belleville washers 61.

The plug 16b has a central threaded hole 16c into which is screwed a screw-adjustment element 64 which includes a manually-operable end 64a and from the centre of which a rod 64b extends. The rod 64b has a threaded portion 65 connected to a circular cylindrical end portion 66 whose outside diameter corresponds to the diameters of the central holes in the Belleville washers 61. An annular shoulder 67 is thus defined between the threaded portion 65 and the cylindrical portion 66 of the rod 64b for cooperating with the first of the set of Belleville washers 61. The screw-adjustment element 64 also has a central through-hole 68 and, at its manually-operable end 64a, a toothed end surface 69 which is adapted to define, with a corresponding spring 70 carried by the plug 16b, auxiliary position-indexing means for the screw-adjustment element 64.

Whilst the active ends 18b of the pin springs 18 are urged against the lateral toothed surface 20b of the toothed ring 20a by the resilient loading of the springs, the axial projections 62a of the locking ring 62 are urged against the toothed end surface 20c of the ring 20a by the resilient loading of the Belleville washers 61, between the locking ring 62 and the annual shoulder 67 of the screw-adjustment element 64 so that both the active ends 18b of the pin springs 18 and the axial projections 62a of the locking ring 62 snap-engage the spaces between the teeth of the ring 20a successively when the hand-grip 2 is rotated. As it moves from one indexed position to another, the locking ring 62 slides axially in the plug 16b and is guided in this movement by the radial appendages 62b which slide in the guides 63 of the plug.

The hole 68 in the screw-adjustment element 64 allows the key 11 to be inserted in order to clamp and release the split rings 54 inside the handlebar 1, as described above.

If the user wishes to increase or decrease the average torque necessary to cause the hand-grip to snap from one position to another, he acts on the operating end 64a of the screw-adjustment element 64 which projects from both the plug 16b of the body of the hand-grip 2 and its outer rubber sheath G, its rotation being indexed by the spring 70 and the toothed end surface 69. The rotation of the element 64 varies the load exerted on the locking ring 62 by the Belleville washers 61 coaxial with the rod portion 64b so that the force required to operate the hand-grip can be varied in dependence on the kind of terrain over which the bicycle is travelling.

The presence of the shaped washer 25a interposed between the support bush 52 and the toothed ring 20a limits the rotation of the hand-grip 2 to a predetermined angle. In fact, the tie-bolts 58 cooperate with the outer radial appendages 25b of the washer 25a whose rotation is limited by the engagement between the inner radial appendages 25c and the diametrally opposed flat surfaces 9e at the free end of the tubular rod 9. At a predetermined angle of rotation, the radial appendages 25b abut the tie-bolts 58 and the internal radial appendages 25c come into contact with one of the flat surfaces 9e to stop the rotation of the hand-grip 2.

Naturally, the principle of the invention remaining the same, the details of construction and forms of embodiment may also be varied widely with respect to those described and illustrated purely by way of example, without thereby departing from the scope of the present invention.

I claim:

1. A twist-grip device for use in combination with a bicycle having a derailleur which controls the selective engagement of a bicycle chain with any one of a plurality of sprockets within a set of different bicycle sprockets arranged side by side, the derailleur being of the type which tends to bias such derailleur towards an end position corresponding to the engagement of such chain with a first end sprocket of such set, said twist grip device comprising a hand-grip mounted rotatably on a bicycle handlebar, a flexible cable transmission connecting the hand-grip to such derailleur, an indexing means associated with the hand-grip for snap-locking the hand-grip in any predetermined position corresponding to the engagement of such chain with any sprocket of such sprocket set, resilient means associated with the hand-grip sufficient to bias the hang-grip in a sense opposite from the sense of biasing of such derailleur so that a resultant effect tends to bias the chain towards a position intermediate of each end sprocket of such sprocket set.

2. A device according to claim 1, wherein the indexing means include a toothed ring fixed releasably to the handlebar and a resilient engagement element which is carried by the hand-grip and is adapted to snap-engage the spaces between the teeth of the toothed ring as a result of the rotation of the hand-grip relative to the handlebar.

3. A device according to claim 2, wherein the indexing means include two resilient engagement elements in the form of pin springs, each pin spring having a tail anchored to the wall of the hand-grip and an end cooperating with the toothed ring.

4. A device according to claim 2, wherein a rod is fixed inside the handlebar and includes an end portion which projects from the handlebar, to which the toothed ring is connected and on which the hand-grip can rotate.

5. A device according to claim 4, wherein the hand-grip has a tubular configuration for housing the end portion of the handlebar and includes a hub which is mounted rotatably on the end part of an rod, the hand-grip also including a tubular appendage which extends beyond the hub on the side opposite the handlebar and defines a chamber in which the indexing means are located, a plug being screwed into the tubular appendage to close the chamber.

6. A device according to claim 5, wherein the end of the rod within the handlebar has a threaded hole, a screw being screwed into the hole and an expansible bush being interposed between an inner end of the rod and a head of the screw so that it expands against an inner wall of the handlebar as a result of the tightening of the screw in the threaded hole.

7. A device according to claim 2, wherein the second resilient means are constituted by a helical spring mounted coaxially around the rod and having respective tails fixed to the rod and to the hand-grip.

8. A device according to claim 1, wherein the inner end of the hand-grip has a collar defining a circumferential track whose angular extent corresponds to the maximum angular travel of the hand-grip, and a clamp body having a skirt and a radial pin which projects inwardly of the clamp body is clamped around the handlebar so that the collar is housed in its skirt, the radial pin carried by the clamp body being housed in the said track so that the engagement of the pin against the end surfaces of the track defines the end positions of the angular travel of the hand-grip.

9. A device according to claim 8, wherein the clamp body has a hole for the fixing of an end screw of the sheath of the flexible cable transmission and the collar defines a circumferential groove for housing the flexible metal cable of the flexible cable transmission and a seat for an enlarged end portion of the flexible cable.

10. A bicycle handle bar having at one end a twist-grip device according to claim 1.

11. A bicycle handle bar having at each end a twist-grip device according to claim 1, one such twist-grip device for operating a front derailleur and the other for operating a rear derailleur.

* * * * *